(12) United States Patent
Li et al.

(10) Patent No.: US 9,509,818 B2
(45) Date of Patent: Nov. 29, 2016

(54) AUTOMATIC CONTACTS SORTING

(71) Applicant: Empire Technology Development LLC, Wilmington, DE (US)

(72) Inventors: Daqi Li, Shaanxi (CN); Jun Fang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 155 days.

(21) Appl. No.: 14/409,530

(22) PCT Filed: Sep. 17, 2013

(86) PCT No.: PCT/CN2013/083606
§ 371 (c)(1),
(2) Date: Dec. 19, 2014

(87) PCT Pub. No.: WO2015/039276
PCT Pub. Date: Mar. 26, 2015

(65) Prior Publication Data
US 2016/0248895 A1   Aug. 25, 2016

(51) Int. Cl.
*G06F 17/30* (2006.01)
*H04M 1/2745* (2006.01)

(52) U.S. Cl.
CPC .. *H04M 1/274583* (2013.01); *G06F 17/30598* (2013.01); *H04M 1/274533* (2013.01)

(58) Field of Classification Search
CPC ................................................ G06F 17/30598
USPC .......................................................... 707/752
See application file for complete search history.

(56) References Cited

U.S. PATENT DOCUMENTS

| | | | |
|---|---|---|---|
| 6,329,986 B1 * | 12/2001 | Cheng | G06F 3/011 345/419 |
| 6,628,204 B1 * | 9/2003 | Ito | G09B 9/00 340/691.2 |
| 7,720,855 B2 * | 5/2010 | Brown | G06Q 10/10 707/758 |

(Continued)

FOREIGN PATENT DOCUMENTS

| | | |
|---|---|---|
| CN | 102006365 A | 4/2011 |
| WO | 2011106925 A1 | 9/2011 |
| WO | 2012000169 A1 | 5/2012 |

OTHER PUBLICATIONS

"Social networking service," accessed at https://web.archive.org/web/20130828084505/http://en.wikipedia.org/wiki/ Social_network_service, last modified on Aug. 26, 2013, pp. 1-20.

(Continued)

*Primary Examiner* — Pierre Vital
*Assistant Examiner* — Nargis Sultana
(74) *Attorney, Agent, or Firm* — Brundidge & Stanger, P.C.

(57) ABSTRACT

To automatically sort multiple contacts of a user, in some examples, a system may be configured to monitor physiological signals, which reflect the emotional responses, of the user during communications between the user and his/her contacts and, further, to classify the contacts into multiple contact groups that may be sorted by the emotional responses of the user.

19 Claims, 4 Drawing Sheets

(56) References Cited

U.S. PATENT DOCUMENTS

| | | | | |
|---|---|---|---|---|
| 8,469,935 | B2* | 6/2013 | Simmons | A61F 13/00068 604/313 |
| 2008/0195728 | A1* | 8/2008 | Betarbet | H04L 12/2602 709/224 |
| 2010/0229108 | A1* | 9/2010 | Gerson | A63F 13/77 715/757 |
| 2011/0196716 | A1* | 8/2011 | Srinivasan | G06Q 30/0201 705/7.29 |
| 2012/0311032 | A1* | 12/2012 | Murphy | G07F 17/3225 709/204 |
| 2012/0324494 | A1* | 12/2012 | Burger | H04H 60/33 725/12 |
| 2013/0272150 | A1* | 10/2013 | Wan | H04L 12/24 370/252 |
| 2014/0058882 | A1* | 2/2014 | Roberts | G06Q 30/0631 705/26.7 |

OTHER PUBLICATIONS

International Search Report and Written Opinion for International Application No. PCT/CN2013/083606 mailed on Jun. 27, 2014.

Lassalle, J., et al., "Combination of physiological and subjective measures to assess quality of experience for audiovisual technologies," Third International Workshop on Quality of Multimedia Experience (QoMEX 2011), pp. 13-18 (Sep. 7-9, 2011).

Leacock, C. and Chodorow, M., "Combining local context and WordNet similarity for word sense identification," in WordNet: An electronic lexical data-base, MIT Press, Eds. Fellbaum, C., pp. 265-283 (1998).

\* cited by examiner

AUTOMATIC CONTACTS SORTING

CROSS-REFERENCE TO RELATED APPLICATION

This Application is the U.S. National Stage filing under 35 US.C. §371 of PCT Application Ser. No. PCT/CN2013/083606 filed on Sep. 17, 2013. The disclosure of the PCT Application is hereby incorporated herein by reference in its entirety.

TECHNICAL FIELD

The technologies described herein pertain generally to automatically sorting a user's multiple communication contacts based on the user's physiological responses during each communication between the user and the contacts.

BACKGROUND

Unless otherwise indicated herein, the approaches described in this section are not prior art to the claims in this application and are not admitted to be prior art by inclusion in this section.

Due to the increasing number of social contacts, a user may manually organize one's contacts. In one example, the user may organize his/her contacts based on the relationship, e.g., relatives, classmates, colleagues, etc. The user may also organize the contacts based on gender, age, etc.

SUMMARY

Technologies are generally described for automatic contacts sorting. The various techniques described herein may be implemented in various methods, systems, and/or computer readable mediums.

In some examples, various embodiments may be implemented as methods. Some methods may include monitoring multiple communications between a user and each of one or more contacts associated with the user, collecting one or more physiological signals from the user during each of the multiple communications, generating a quality of experience (QoE) vector space for each of the one or more contacts associated with the user based on the collected physiological signals, classifying each of the multiple communications into one or more multiple predetermined classifications, updating the QoE vector space for each of the one or more contacts based on the collected physiological signals, categorizing the one or more contacts into multiple contact groups in accordance with the updated QoE vector spaces, and sorting the contact groups based on the updated QoE vector spaces.

In some examples, various embodiments may be implemented as systems. Some systems may include a QoE detector configured to collect one or more physiological signals from a user during each of multiple communications between the user and multiple contacts, a communication monitor configured to monitor the multiple communications, a vector generator configured to generate a QoE vector space for each of the multiple contacts, a classifier configured to classify the multiple communications in accordance with multiple predetermined classifications, an update manager configured to update the QoE vector space for each of the multiple contacts based on the collected one or more physiological signals, a categorizer configured to categorize the multiple contacts into multiple friends groups in accordance with the updated QoE vector spaces, and a sorter configured to sort the contact groups based on the updated vector spaces.

In some examples, various embodiments may be implemented as a computer-readable medium storing executable instructions that, when executed, cause one or more processors to perform operations comprising monitoring multiple communications between a user and one or more contacts, collecting one or more physiological signals from the users during each of the communications, generating a QoE vector space for each of the one or more contacts based on the one or more physiological signals, categorizing the one or more contacts into multiple contact groups in accordance with the QoE vector spaces, sorting the contact groups based on the QoE vector spaces.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
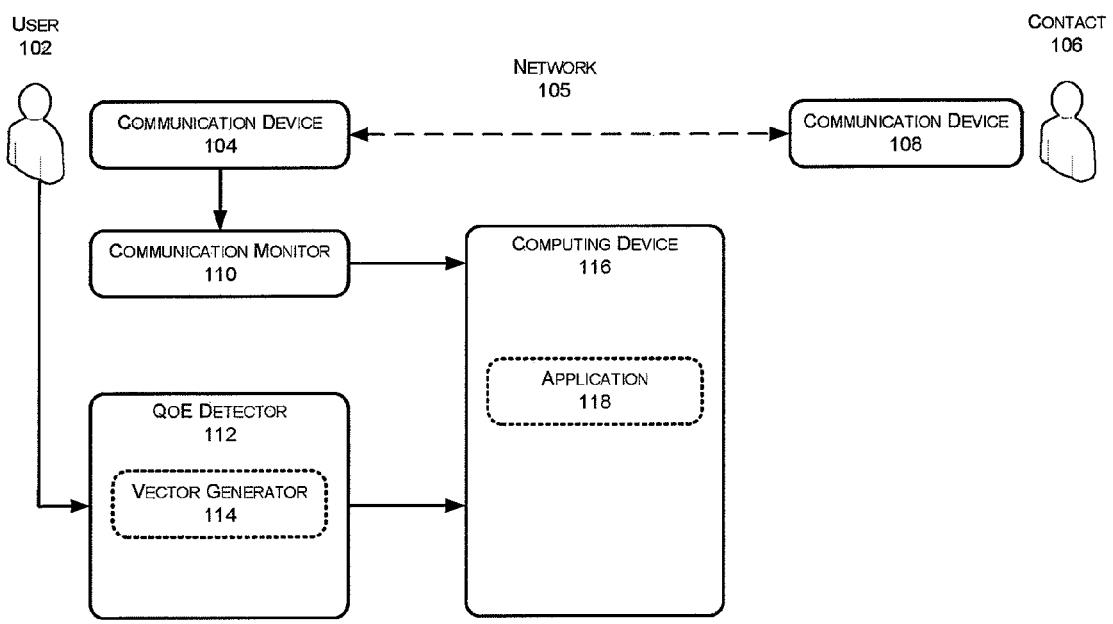
FIG. 1 shows an example environment in which automatic contacts sorting may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example environment 100 in which automatic contacts sorting may be implemented, arranged in accordance with at least some embodiments described herein. As depicted, example environment 100 may include, at least, a user 102, a communication device 104, a network 105, a contact 106, a communication device 108, a communication monitor 110, a Quality of Experience (QoE) detector 112, a vector generator 114, a computing device 116, and an application 118.

User 102 may refer to a person who owns and/or otherwise operates communication device 104 to communicate via network 105 with one of his/her contacts, e.g., contact 106. References to the one or more communications between user 102 and contact 106 may be assumed to include communication devices 104 and 108.

Communication device 104 may refer to a mobile (or portable) electronic device such as a mobile phone, smartphone, personal digital assistant (PDA) a personal media player device, an application specific device, or a hybrid device that includes any of the above functions, under the ownership and/or operative control of user 102. Communication device 104 may be configured to store a list that includes contacts for user 102. The contacts may be regarded as online contact, although the medium for reaching the contacts may incorporate network, telephone, and near-field communication technologies. Each contact may be identified by the personal information stored in the list, e.g., name, gender, email address, IP address, phone number, account name, user name, alias, etc.

Network 105 may refer to one or more communication links that follow or implement at least one of communication protocols to support communication between communication devices 104 and 108. The communication protocols may include any mobile communications technology, e.g., Global System for Mobile Communications (GSM), Code Division Multiple Access (CDMA), etc., depending upon the technologies supported by particular wireless service providers. The one or more communication links may be implemented utilizing non-cellular technologies such as conventional analog amplitude modulation (AM) or frequency modulation (FM) radio, Wireless Fidelity (Wi-F™), wireless local area network (WLAN or IEEE 802.11), Worldwide Interoperability for Microwave Access (Wi-MAX™), Bluetooth™, hard-wired connections, e.g., cable, phone lines, and other analog and digital wireless voice and data transmission technologies.

Contact 106 may refer to one of family members, friends, colleagues, and/or acquaintances of user 102, with whom user 102 may communicate, via network 105 established between communication device 104 and 108. Such communication may be implemented by one of many online mediums including, but not limited to, email, video-calls, phone calls, online chats, social networking services, etc.

Similar to communication device 104, communication device 108 may refer to a mobile (or portable) electronic device such as a mobile phone, smartphone, personal digital assistant (PDA) a personal media player device, an application specific device, or a hybrid device that includes any of the above functions, under the ownership and/or operative control of contact 106.

Communication monitor 110 may refer to a module or other component hosted or implemented on communication device 104, which may be configured to monitor the multiple communications between user 102 using, e.g., communication device 104, and contact 106 using, e.g., communication device 108. That is, communication monitor 110 may be configured to capture at least portions of the content of the communication between user 102 and contact 106 and, further, transmit at least some of the captured portions of content to computing device 116. In some examples, communication monitor 110 may convert an audible communication between user 102 and contact 106 into a text file. Communication monitor 110 may perform such conversion using one or more existing voice recognition algorithms. Further, in accordance with various embodiments, communication monitor 110 may be implemented as hardware, firmware, software, or any combination thereof.

QoE detector 112 may refer to a module or component that may be configured to collect physiological feedback signals from user 102 during the course of each communication between user 102 using, e.g., communication device 104, and one or more of contacts 106 using, e.g., a corresponding one of communication device 108. Non-limiting examples of the physiological feedback signals may include one or more facial expressions, changes in tone of voice, blood pressure, brain waves, heart rate, etc. In some examples, QoE detector 112 may be further configured to digitalize the collected physiological into respective values. In some embodiments, QoE detector 112 may refer to a physical device. In accordance with various embodiments, one or more of QoE detector 112 may be implemented as hardware, firmware, software, or any combination thereof. Non-limiting examples of QoE detector 112 may include includes a camera, a microphone, a sphygmomanometer, an electroencephalography monitor, a heart rate monitor, one or more combinations thereof, etc.

Vector generator 114 may refer to a module or component that may be configured to generate a QoE vector space for each of the contacts 106 corresponding to user 102, based on the digitalized physiological feedback signals. The QoE vector space may include multiple QoE vectors in multiple dimensions. The dimensions of the QoE vector space may represent a respective topic of the communication. Examples of the topics may include work, study, entertainment, etc. In some examples, the QoE vector space corresponding to a contact, U, may be referred to as $$V_U = \begin{bmatrix} v_1 \\ v_2 \\ \vdots \\ v_n \end{bmatrix},$$

for which n represents the total number of the topics. Each QoE vector may further include multiple elements, each of which may represent a value of a physiological signal. For example, vector $v_1$ may include elements $q_1$, $q_2$, and $q_3$, i.e., $v_1=(q_1, q_2, q_3)$, for which $q_1$, $q_2$, and $q_3$ may respectively represent the values for the blood pressure, pulse, and breathing rate of user 102 during the course of a communication with one of users 106. The value of each QoE vector in the QoE vector space may be initialized by vector generator 114 as a predetermined value, e.g., 0.1, 0, etc. In some embodiments, vector generator 114 may be implemented as a physical component, e.g., a microchip embedded in QoE detector 112. Alternative embodiments may contemplate vector generator 114 being implemented as hardware, firmware, software, or any combination thereof.

Computing device 116 may refer to a computing device, module, or component that may be communicatively coupled to communication monitor 110 and QoE detector 112 and host application 118. Computing device 116 may include one or more hardware components, e.g., memories, central processing units (CPUs), network adapters, etc.

Application 118 may refer to a software program executing on computing device 116. In some examples, application 118 may be configured to classify a communication into one of multiple predetermined topics in accordance with the captured content of the communication. For example, a conversation between user 102 and one of contacts 106 regarding a deadline may be classified as a work related topic, while an email exchange between user 102 and the same or another one of contacts 106 regarding golf may be classified as an entertainment related topic.

Further, application 118 may be configured to receive a QoE vector space corresponding to the contact of the communication and, further, to update a QoE vector corresponding to the topic in accordance with the physiological signals collected during the respective communication. For example, the received QoE vector space may include a QoE vector designated for a work related topic. Once user 102 starts to communicate with contact 106, communication monitor 110 may be configured to capture the content of the communication. Meanwhile, QoE detector 112 may be configured to collect the physiological signals, e.g., blood pressure or tone of voice, from user 102 and to generate a new vector value for the QoE vector related to work topic. Since physiological signals may reflect the emotional response of user 102, a high blood pressure value and/or an angry tone of voice may indicate the corresponding contact is not favorable to user 102. Application 118 may then be configured to update the respective QoE vector and, further, to sort the contacts based on the QoE vector space so that the contacts may be classified by the emotional responses of the user.

Thus, example environment 100 may include, at least, user 102 communicating with contact 106, communication monitor 110 monitoring the content of the communication, QoE detector 112 collecting physiological signals from user 102, and application 118, hosted on computing device 116, which may be configured to update a QoE vector that corresponds to the communication and, further, to sort the contacts of user 102 based on a QoE vector space that includes multiple QoE vectors.

Figure 2:
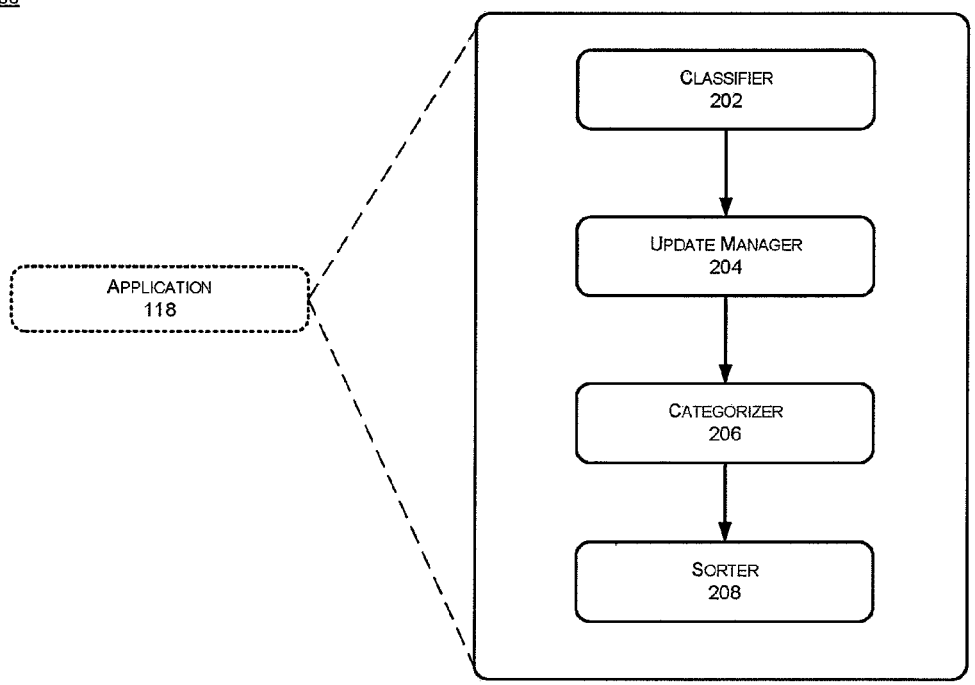
FIG. 2 shows an example configuration of an example application by which automatic contacts sorting may be implemented.

FIG. 2 shows an example configuration 200 of an example application 118 by which automatic contacts sorting may be implemented, all arranged in accordance with at least some embodiments described herein. As depicted, example configuration 200 may include, at least, a classifier 202, an update manager 204, a categorizer 206, and a sorter 208.

Classifier 202 may refer to a module or component of application 118 that is hosted on computing device 116, which may be configured to classify monitored communications into multiple predetermined topics in accordance with the content of the respective communications captured by communication monitor 110. In some examples, classifier 202 may first identify multiple topical terms associated with each predetermined topic. For example, a set of topical terms associated with a work related topic may include "office," "document," "contract," "business," etc. Another set of topical terms associated with an entertainment related topic may include "movie," "game," "TV," etc.

The QoE vectors corresponding to the respective dimensions of the QoE vector space may correspond to a predetermined topic, and a set of topical terms of a QoE vector $v_j$ may be represented as $W_T^j = \{w_{1T}^j, w_{2T}^j, \ldots\}$. Classifier 202 may thus be configured to extract one or more key terms from the content of the communication captured by communication monitor 110. The extracting may include deleting articles, propositions, and/or conjunctions. Classifier 202 may further be configured to calculate a relatedness value between the set of key terms and each set of topical terms. A set of key terms may be represented as $W_c = \{w_c^1, w_c^2, \ldots\}$. The corresponding communication may then be classified as a topic for which a maximum relatedness value is calculated. The relatedness value between a set of key terms and a set of topical terms may be represented by $$SIM(W_c, W_T^j) = \sum_{w_T^j \in W_T^j; w_c \in W_c} \max[sim(w_c, w_T^j)],$$

for which $sim(w_c, w_T^j) \begin{cases} 1, & w_c = w_T^j \\ sim_{wordnet}(w_c, w_T^j), & w_c \neq w_T^j \end{cases}$ and and the function $sim_{wordnet}(w_1, w_2)$ is determined by known methodologies.

Update manager 204 may refer to a module or component of application 118 hosted on computing device 116 that may be configured to update the QoE vectors in the QoE vector space in accordance with the collected physiological feedback signals when at least one of one or more predetermined conditions is triggered. The one or more predetermined conditions may include a predetermined passage of time since a most recent update, e.g., a day, 48 hours, a week, an occurrence of a predetermined number of communication, etc.

Categorizer 206 may refer to a module or component of application 118 hosted on computing device 116 that may be configured to categorize the contacts 106 of user 102 into multiple contact groups, i.e., $G_i$, in accordance with each updated QoE vector space. In a non-limiting example, categorizer 206 may first identify a group of QoE vector spaces respectively generated for one of the contacts of user 102. The group of QoE vector spaces may be represented as $V_U = \{V_{u_1}, V_{u_2}, \ldots, V_{u_i}, \ldots, V_{u_n}\}$, for which n may represent the number of embodiments of contact 106.

Categorizer 206 may be configured to then randomly select a predetermined number of QoE vector spaces from the group as centers of the contact groups. Centers here may each refer to a vector space around which other vectors may be grouped. The number may be predetermined in accordance with the number of the contact groups. Further, categorizer 206 may be configured to compute a distance value between each of the unselected QoE vector spaces and each of the centers of the contact groups. The distance value between two vector spaces $V_{u_i}$ and $V_{u_j}$ may be computed in accordance with the following equation:

$$dis(V_{u_i}, V_{u_j}) = \frac{\sum_{k=1}^{n}(v_k^i - v_k^j)}{|V_{u_j}| \cdot |V_{u_i}|},$$

for which $v_k^i$ and $v_k^j$ may respectively refer to the QoE vectors of vector spaces $V_{u_i}$ and $V_{u_j}$. Each of the unselected QoE vector spaces may then be clustered to a closest center, i.e., a center that corresponds to a minimum one of the computed distance values. Once one or more unselected QoE vector spaces clustered to each of the centers, categorizer 206 may be configured to compute a new center for each cluster so that the sum of the distance values between the new center and other QoE vector spaces in the cluster may be minimum.

Further, categorizer 206 may be configured to calculate a mean square value for the QoE vector spaces of each cluster. If the mean square value of a respective cluster is less than a predetermined value, categorizer 206 may identify the cluster as a contact group. If the mean square value of the respective cluster is not less than the predetermined value, categorizer 206 may re-select the predetermined number of QoE vector spaces and perform the aforementioned processing again.

Sorter 208 may refer to a module or component of application 118 hosted on computing device 116 that may be configured to sort the multiple contact groups in accordance with an overall ranking value of each contact group or a ranking value with respect to one or the predetermined topics. The overall ranking value $r_i$ of each contact group may be calculated in accordance with the equation:

$$r_i = \frac{\sum V_{u_l} \in G \sum_{l=1}^{n} v_l}{|G_i|}.$$

The ranking value with respect a predetermined topic may be calculated as $$r_i = \frac{\sum_{v_l \in V_u, V_e \in G} v_l}{|G_i|}.$$

Thus, the contacts of user 102 may be classified into different groups and sorted in accordance with the emotional responses of user 102.

Figure 3:
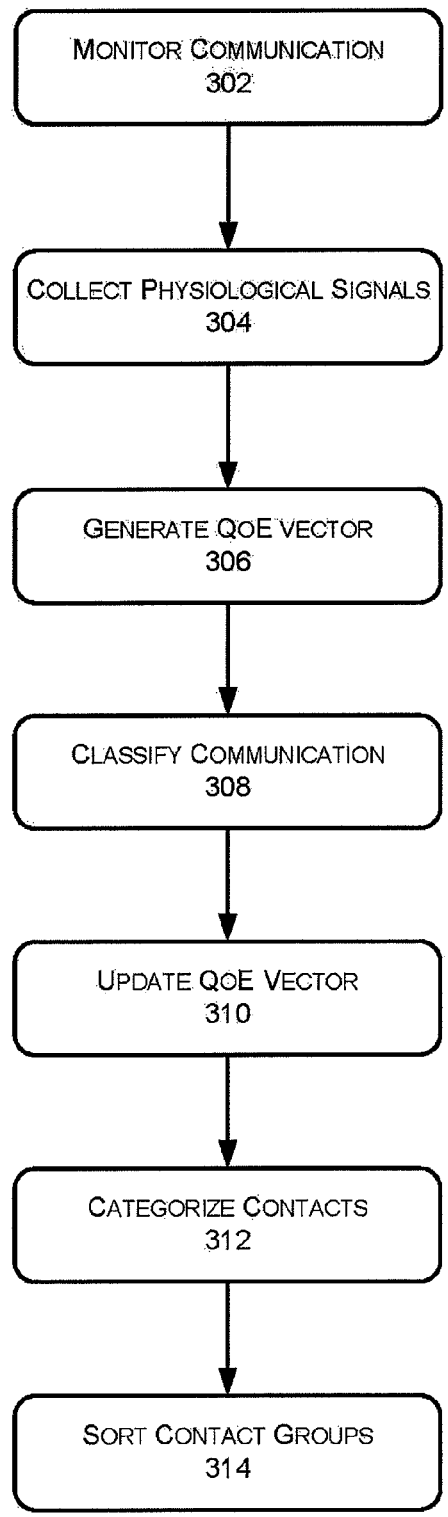
FIG. 3 shows an example configuration of a processing flow of operations by which automatic contacts sorting may be implemented.

FIG. 3 shows an example configuration of a processing flow of operations by which automatic contacts sorting may be implemented, all arranged in accordance with at least some embodiments described herein. As depicted, processing flow 300 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, 310, 312, and/or 314. Processing may begin at block 302.

Block 302 (Monitor Communication) may refer to communication monitor 110 monitoring multiple communications between user 102 and contact 106. That is, communication monitor 110 may be configured to capture the content of the communication between user 102 and contact 106 and, further, transmit the captured content to computing device 116. For example, communication monitor 110 may be configured to record an email exchange between user 102 and contact 106 in a text file. With respect to audible communications, communication monitor 110 may be configured to record the audible communication and convert the audio file into a text file with known voice recognition technologies. Processing may continue from block 302 to block 304.

Block 304 (Collect Physiological Signals) may refer to QoE detector 112 collecting one or more physiological feedback signals from user 102 during the course of each of the multiple communications between user 102 and contact 106. Non-limiting examples of the physiological feedback signals include one or more facial expressions, changes in tone of voice, blood pressure, brain waves, heart rate, etc. In some examples, QoE detector 112 may be further configured to digitalize the collected physiological feedback signals into respective values. Non-limiting examples of QoE detector 112 may include includes a camera, a microphone, a sphygmomanometer, an electroencephalography monitor, a heart rate monitor, or a combination thereof. Processing may continue from block 304 to block 306.

Block 306 (Generate QoE vector) may refer to vector generator 114 generating a QoE vector space for each of one or more contacts 106 corresponding to user 102 based on the digitalized physiological signals. The QoE vector space may include multiple QoE vectors in multiple dimensions. Each dimension of the QoE vector space may represent a topic of the communication. Examples of the topics may include work, study, entertainment, etc. Processing may continue from block 306 to block 308.

Block 308 (Classify Communication) may refer to classifier 202 classifying each of the multiple communications into multiple predetermined topics in accordance with the content of the communication captured by communication monitor 110. In some examples, classifier 202 may first identify multiple topical terms associated with each predetermined topic. Classifier 202 may then be configured to extract one or more key terms from the captured content of the communication. The extracted key terms may include articles, propositions, and/or conjunctions. Classifier 202 may further be configured to calculate a relatedness value between the set of key terms and each set of topical terms. The corresponding communication may then be classified according to a topic for which a maximum relatedness value is calculated. Processing may continue from block 308 to block 310.

Block 310 (Update QoE Vector) may refer to update manager 204 updating the QoE vector space for each of the one or more contacts based on the collected physiological signals when at least one of one or more predetermined conditions is triggered. The one or more predetermined conditions may include a predetermined passage in time since a most recent update, e.g., a day, 48 hours, a week, an occurrence of a predetermined number of communication, etc. Processing may continue from block 310 to block 312.

Block 312 (Categorize Contacts) may refer to categorizer 206 categorizing the one or more embodiments of contact 106 into multiple contact groups in accordance with the updated QoE vector spaces. In a non-limiting example, categorizer 206 may first identify a group of QoE vector spaces each generated for one of the contacts of user 102. Categorizer 206 may be configured to then randomly select a predetermined number of QoE vector spaces from the group as centers of the contact groups. The number may be predetermined in accordance with the number of the contact groups. Further, categorizer 206 may be configured to compute a distance value between each of the unselected QoE vector spaces and each of the centers. Each of the unselected QoE vector spaces may then be clustered to a closest center, i.e., a center that corresponds to a minimum one of the computed distance values. Once one or more unselected QoE vector spaces clustered to each of the centers, categorizer 206 may be configured to compute a new center for each cluster so that the sum of the distance values between the new center and other QoE vector spaces in the cluster may be minimized.

Further, categorizer 206 may be configured to calculate a mean square value for the QoE vector spaces in each cluster. If the mean square value of a respective cluster is less than a predetermined value, categorizer 206 may be configured to identify the cluster as a contact group. If the mean square value of the respective cluster is not less than the predetermined value, categorizer 206 may re-select the predetermined number of QoE vector spaces and perform the above-identified processing again. Processing may continue from block 312 to block 314.

Block 314 (Sort Contact Groups) may refer to sorter 208 sorting the contact groups based on the updated QoE vector spaces groups in accordance with an overall ranking value of each contact group or a ranking value with respect to one of the predetermined topics.

Thus, the contacts of user 102 may be classified into different groups and sorted in accordance with the emotional responses of user 102 with respect to one of the predetermined topics. For example, contacts for whom user 102 expresses apprehension during communications regarding work may be grouped together.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
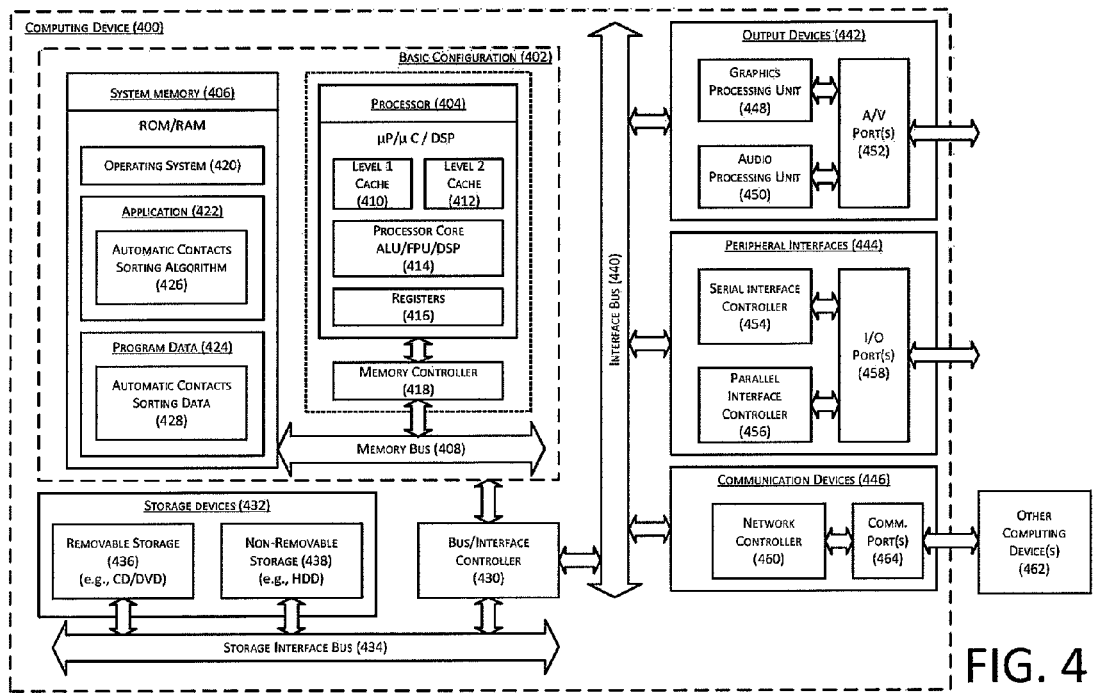
FIG. 4 shows a block diagram illustrating an example computing device that is arranged for automatic contacts sorting, all arranged in accordance with at least some embodiments described herein.

FIG. 4 shows a block diagram illustrating an example computing device that is arranged for automatic contacts sorting, all arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an automatic contacts sorting algorithm 426 that is arranged to perform the functions as described herein including those. Program data 424 may include automatic contacts sorting data 428 that may be useful for operation with automatic contacts sorting algorithm 426 as is described herein. In some embodiments, application 422 may be arranged to operate with program data 424 on operating system 420 such that implementations of automatic contacts sorting may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for categorizing contacts, comprising:
generating a quality of experience (QoE) vector space for each of one or more contacts associated with a user;
monitoring multiple communications between the user and each of the one or more contacts;
collecting one or more physiological signals from the user during each of the multiple monitored communications;
classifying each of the multiple monitored communications into multiple predetermined classifications;
updating the QoE vector space for each of the one or more contacts based on the collected physiological signals;
categorizing the one or more contacts into multiple contact groups in accordance with the updated QoE vector spaces, the categorizing including:
randomly selecting multiple QoE vector spaces, from the updated QoE vector spaces, as multiple centers,
computing a distance value between each unselected QoE vector space and each of the multiple centers,
clustering each unselected QoE vector space to one of the multiple centers that corresponds to a minimum one of the computed distance values to form the multiple contact groups,
calculating a new center for each of the multiple contact groups,
calculating a mean square value for each of the multiple contact groups,
reverting to the computing of the distance value if the calculated mean square value is larger than a predetermined mean square value, and
validating the categorizing if the calculated mean square value is less than or equal to the predetermined mean square value; and
sorting the categorized contact groups based on the updated QoE vector spaces.

2. The method of claim 1, wherein the generated QoE vector space for each of the one or more contacts associated with the user includes multiple vectors in respective multiple dimensions, each of which corresponds to one of the multiple predetermined classifications.

3. The method of claim 2, wherein each of the multiple vectors includes one or more elements, each of which corresponds to one of the one or more physiological signals.

4. The method of claim 1, wherein the multiple monitored communications include at least one of telephone conversation, a text message exchange, an email exchange, or a video chat.

5. The method of claim 1, further comprising identifying at least one of the one or more contacts based on at least one of an account name, an IP address, a phone number, a user name, a facial image, and a voice of the user.

6. The method of claim 1, wherein the multiple predetermined classifications include at least work, study, travel, and entertainment.

7. The method of claim 1, wherein each of the multiple predetermined classifications is associated with one or more topical terms.

8. The method of claim 7, wherein the classifying includes extracting one or more key words from each of the multiple communications.

9. The method of claim 8, wherein the classifying further includes calculating a semantic relatedness value between the one or more topical terms and the one or more extracted key words.

10. The method of claim 1, wherein the one or more physiological signals include at least one of blood pressure, breath frequency, pulse, voice, facial expression, or brain activities.

11. A system, comprising:
   a QoE detector configured to collect one or more physiological signals from a user during each of multiple communications between the user and multiple contacts;
   a communication monitor configured to monitor the multiple communications;
   a vector generator configured to generate a QoE vector space for each of the multiple contacts; and
   a processor coupled to a memory storing executable components, the processor operable to execute or facilitate execution of one or more of the executable components, the executable components comprising:
      a classifier configured to classify the multiple monitored communications in accordance with multiple predetermined classifications;
      an update manager configured to update the QoE vector space for each of the multiple contacts based on the collected one or more physiological signals;
      a categorizer configured to:
         categorize the multiple contacts into multiple friends groups in accordance with the updated QoE vector spaces,
         randomly select multiple QoE vector spaces, from the updated QoE vector spaces, as multiple centers,
         compute a distance value between each of the unselected QoE vector spaces and each of the multiple centers,
         cluster each of the unselected QoE vector spaces to one of the multiple centers that corresponds to a minimum one of the computed distance values to form the multiple contact groups,
         calculate a new center for each of the multiple contact groups,
         calculate a mean square value for each of the multiple contact groups,
         revert to compute the distance value if the mean square value is larger than a predetermined mean square value, and
         end if the mean square value is less than or equal to the predetermined mean square value; and
      a sorter configured to sort the contact groups based on the updated vector spaces.

12. The system of claim 11, wherein the QoE detector includes a camera, a microphone, a sphygmomanometer, an electroencephalography monitor, a heart rate monitor, or a combination thereof.

13. The system of claim 11, wherein the QoE vector space includes multiple vectors in respective multiple dimensions, each of which corresponds to one of the multiple predetermined topics.

14. The system of claim 11, wherein each of the multiple predetermined classifications is associated with one or more topical terms.

15. The system of claim 14, wherein classifier is further configured to extract one or more key words from each of the multiple communications.

16. The system of claim 15, wherein the classifier is further configured to calculate a semantic relatedness value between the one or more topical terms and the one or more extracted key words.

17. A non-transitory computer-readable medium that stores executable-instructions that, when executed, cause one or more processors to perform operations comprising:
   monitoring multiple communications between a user and one or more contacts;
   collecting one or more physiological signals from the users during each of the multiple monitored communications;
   generating a QoE vector space for each of the one or more contacts based on the one or more physiological signals;
   categorizing the one or more contacts into multiple contact groups in accordance with the QoE vector spaces, the categorizing including:
      randomly selecting multiple QoE vector spaces, from the updated QoE vector spaces, as multiple centers,
      computing a distance value between each of the unselected QoE vector spaces and each of the multiple centers,
      clustering each of the unselected QoE vector spaces to one of the multiple centers that corresponds to a minimum one of the computed distance values to form the multiple contact groups,
      calculating a new center for each of the multiple contact groups,
      calculating a mean square value for each of the multiple contact groups,
      reverting to the computing of the distance value if the calculated mean square value is larger than a predetermined mean square value, and
      validating the categorizing if the mean square value is less than or equal to the predetermined mean square value; and
   sorting the categorized contact groups based on the QoE vector spaces.

18. The non-transitory computer-readable medium of claim 17, further comprising classifying the multiple communications in accordance with multiple predetermined classifications.

19. The non-transitory computer-readable medium of claim 18, further comprising:
   associating one or more topical terms with each of the multiple predetermined topics;
   extracting one or more key words from each of the multiple communications; and
   calculating a semantic relatedness value between the one or more topical terms and the one or more extracted key words.

* * * * *

UNITED STATES PATENT AND TRADEMARK OFFICE
CERTIFICATE OF CORRECTION

PATENT NO. : 9,509,818 B2
APPLICATION NO. : 14/409530
DATED : November 29, 2016
INVENTOR(S) : Li et al.

It is certified that error appears in the above-identified patent and that said Letters Patent is hereby corrected as shown below:

In the Specification

In Column 1, Line 7, delete "US.C. §371" and insert -- U.S.C. § 371 --, therefor.

In Column 3, Line 37, delete "(Wi-F™)," and insert -- (Wi-Fi™), --, therefor.

In Column 7, Lines 25-27, delete " $r_i = \dfrac{\sum_{v_l \in V_u, V_e \in G} v_l}{|G_i|}.$ " and insert -- $r_i = \dfrac{\sum_{v_l \in V_u, V_u \in G} v_l}{|G_i|}.$ --, therefor.

Signed and Sealed this
Fourth Day of April, 2017

Michelle K. Lee
*Director of the United States Patent and Trademark Office*